United States Patent

Carter et al.

[11] 4,235,103
[45] Nov. 25, 1980

[54] AEROLOAD TORQUE SIMULATOR

[75] Inventors: James W. Carter, Melrose; Donald C. Lee, Waltham; Vincent A. Simeone, Winchester; Frank L. Cheever, Sudbury, all of Mass.

[73] Assignee: The United States of America as represented by the Secretary of the Army, Washington, D.C.

[21] Appl. No.: 30,203

[22] Filed: Apr. 16, 1979

[51] Int. Cl.³ .................. G01M 17/06; G01M 9/00
[52] U.S. Cl. ................................ 73/168; 73/432 SD
[58] Field of Search ............... 73/167, 168, 133 R, 73/452 SD

[56] References Cited

U.S. PATENT DOCUMENTS

| 3,098,382 | 7/1963 | Hoffman et al. | 73/168 |
| 3,727,456 | 4/1973 | Grüneberg | 73/168 |
| 4,131,010 | 12/1978 | Eyres | 73/168 |

Primary Examiner—James J. Gill
Attorney, Agent, or Firm—Nathan Edelberg; Robert P. Gibson; Freddie M. Bush

[57] ABSTRACT

The aeroload torque simulator provides torques for either statically or dynamically loading the output shaft of a power servo system such as a missile fin control system. It simulates the aerodynamic torque load developed at the missile fin which varies dynamically in flight.

2 Claims, 2 Drawing Figures

AEROLOAD TORQUE SIMULATOR

DEDICATORY CLAUSE

The invention described herein was made in the course of a contract with the Government and may be manufactured, used, and licensed by or for the Government for governmental purposes without the payment to us of any royalties thereon.

BACKGROUND OF THE INVENTION

In a missile system, aerodynamic loads are introduced during flight at the missile fins as a function, for example, of air density or fin angle. The missile fin control system must respond to these loads to maintain flight control. In testing response of such systems, the dynamic response of a loading device must be significantly better than that of the test article that it loads so as to not unrealistically affect performance of the article. Since missile fin control systems are inherently high performance servos, the performance requirements of the load simulator are demanding. It has been the prior art custom to load such systems with passive devices such as mechanical springs or torsion bars or by means of a pneumatic actuator with a large pressure chamber which is the equivalent of a pneumatic spring. There are disadvantages of these devices. For example, they are not adaptable to rapdily switching from an opposing to an aiding or overdrive load which reflect a realistic condition for many applications. They are also inflexible with respect to permitting rapid dynamic variations in loading.

SUMMARY OF THE INVENTION

The aeroload torque simulator provides variable and controllable torques which can be used to either statically or dynamically load the output shaft of a power servo system such as a missile fin control system. In such an application it simulates the aerodynamics torque load developed at the missile fin which varies dynamically in flight as a function of such parameters as missile velocity, altitude, air density, and fin angle. The dynamic performance of a servo system, except under limiting constraints, is nonlinearly affected by the output load level. Thus the simulator provides the capability of performing a realistic evaluation of the performance of a system such as a missile control prior to actual flight tests, without recourse to expensive wind tunnel tests. It is also a tool to be utilized in post flight evaluation for faithfully reproducing actual flight loading conditions.

DESCRIPTION OF THE PREFERRED EMBODIMENT

Figure 1:
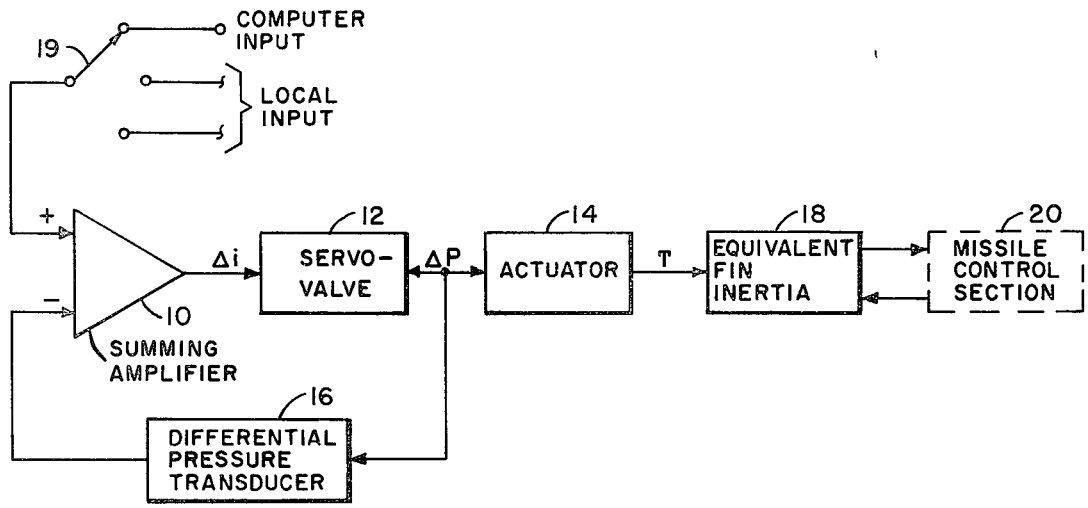
FIG. 1 is a block diagram of a preferred embodiment of the aeroload torque simulator coupled to a missile control section.
Figure 2:
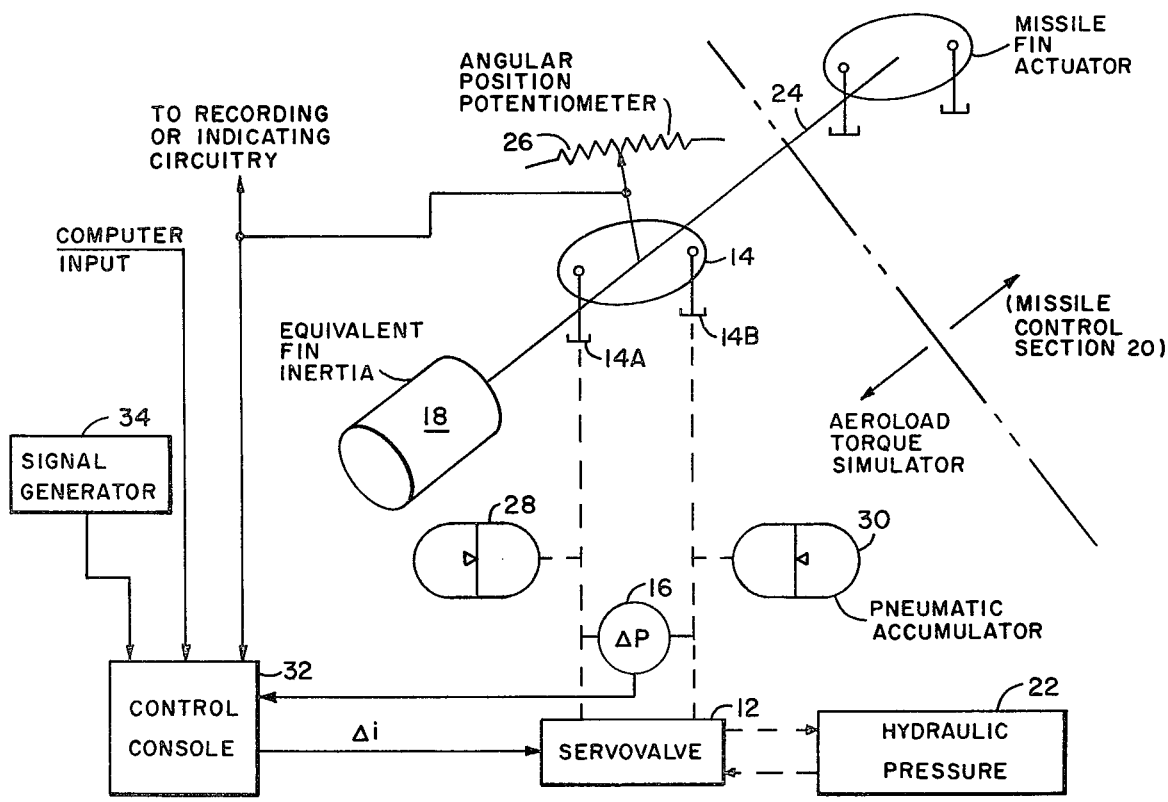
FIG. 2 is a partial schematic partial block diagram showing the electrical and hydraulic connections of the preferred embodiment of FIG. 1.

Referring now to FIGS. 1 and 2 of the drawings an areoload torque simulator is shown wherein like numbers represent like parts. FIG. 1 sets forth a summing amplifier 10 having an output coupled to a servo valve 12. Servo valve 12 operates actuator 14 and provides a feedback path through differential pressure transducer 16 to amplifier 10. Actuator 14 is mechanically coupled to provide torque or force to the load device under test. For a missile system the test device may be the missile fins, such that actuator 14 is coupled to a fin shaft of the missile for applying equivalent torquing forces thereto that would normally be applied by external forces acting on the fin itself. This force acts to accelerate the fin or the equivalent fin inertia 18 to cause a change in angular velocity and position of the fin shaft of the test device. The missile control section 20 responds to the torque applied to the fin shaft by providing restoration or corrective signals thereto, for overcoming the load and repositioning the fin in the correct position. Summing amplifier 10 has an input electrical signal which provides the torque load commands to the amplifier. Selective fixed or variable local input signal voltages may be applied or the respective inputs may be computer controlled. A switching circuit 19 can provide the local or remote input to the amplifier.

FIG. 2 is a schematic showing servo valve 12 coupled between a source of hydraulic pressure 22 and the actuator 14 push rods for developing torque to a missile fin shaft 24. A potentiometer 26 coupled to the actuator 14 indicates the angular position of the torqued shaft with respect to a fixed reference point. Pneumatic accumulators 28 and 30 are coupled to the hydraulic supply and return loop for high frequency damping, allowing high gain and bandwidth. A control console 32 serves a central point of control and houses, for example, summing amplifier 10 and selector switch 19 (FIG. 1) for selecting the particular input torque load commands to be coupled to the amplifier. An aeroload torque simulator may consist of one or mor etorque systems mounted on a common base. For example, with a four axis missile control the simulator may consist of four torque systems which provide the capability of simultaneously and independently loading each axis. The controls and electronics for each of the four systems are conveniently located in console 32.

Torque is developed by the hydraulically energized push-push actuator 14 controlled by the servo valve. The servo loop is closed around the pressure differential between the two cylinders 14A and 14B of the actuator which is proportional to output torque minus friction. Torque can be provided as an opposing or aiding load. Torque can also be provided as a bias load, spring load or can be programmed with almost infinite variation subject to the static and dymanic limits of the system.

Each actuator assembly 14 is adjustable in three directions to eliminate mis-alignment with the missile controls and undue bearing friction loading. Inboard and outboard bearings on the simulator actuator eliminates imposing bending loads on the missile control thus providing a pure torque load. The simulator actuator push-rods 14A and 14B are adjustable in length providing a means of setting the angular displacement to conform to the particular missile under test and also to limit over travel and prevent excessive loading of the missile actuator by the simulator. Readily replaceable cylinder sleeves and pistons in the actuator 14 assembly provides the capability of changing the torque level by changing the sleeve bore size to provide the optimum hydraulic power requirement. The torque level may also be adjusted by a change in hydraulic supply pressure. Use of a splined drive shaft on actuator 14, so that the shaft can be readily removed, facilitates missile control section installation into the simulator assembly. A split-spline actuator rocker arm arrangement eliminates back-lash between the drive shaft and the actuator pistons.

In operation, torque in the missile system under test is developed by the means of hydraulic power from the simulator. A single voltage applied to current amplifier 10 and thence to the conventional four-way proportinal hydraulic flow control valve 12 produces a displacement of the valve spool controlling the flow of hydraulic fluid to actuator 14 which is physically coupled to the output shaft of the test article control system. The differential pressure between the two cylinders 14A and 14B of the push-push actuator is a measure of the output torque of the actuator minus the actuator friction. The differential pressure is measured by pressure transducer 16, converted to a scaled voltage, and coupled back to the (−) input of amplifiers 10 of the control console 32, where it is compared to the (+) input voltage. Thus the input voltage controls and is proportional to the torque developed by the valve/actuator.

After actuator 14 is initially coupled to the fin shaft 24, the missile control section may first be energized to position the fin shaft before the aeroload simulator is energized or vice-versa. In either situation, activation of the simulator results in an initial input, as from the local generator 34, to the (+) input of amplifier 10 which applies $\Delta i$ to activate servovalve 12. As the hydraulic pressure is applied through valve 12 to actuator 14, the differential pressure $\Delta P$ is fed back and ultimately equals the (+) input, bringing the output of amplifier 10 to 0. This feedback maintains the hydraulic pressure and the resultant force on the shaft 24 while the missile control section operates against the force. This torque will be maintained until the generator 34 output is increased or decreased to cause a change in $\Delta i$. Thus by varying $\Delta i$ of the simulator, the hydraulic pressure is changed, the applied torque is changed, and the missile control section must respond to these changes to follow a known simulated flight path.

During operation, the simulator actuator 14 is physically driven by the output shaft 24 of the test article control system. Typically, output shaft 24 is driven by the control section as for providing routine fin positioning commands during a flight. However, the commanded torque level under the dynamic displacement condition is maintained on the shaft by the aeroload simulator control system. These torque load commands can be inputted into the simulator from a computer which develops the torque based on the flight profile and missile performance. Torque commands can also be introduced into the simulator locally (manually) from sources such as the signal generator 34 or from the potentiometer 26 which is coupled to the actuator driveshaft and develops a torque proportional to the actuator angular displacement.

The push-push actuator used in the aeroload torque simulator eliminates backlash and reduces linkage requirements resulting in a high hydro/mechanical resonant frequency. The utilization of hydro/pneumatic accumulators at the actuators for damping permits a higher loop gain and increases bandwidth with adequate stability. The system is more efficient than other viscous damping devices or bleed orifices. The overall design is highly flexible in that it can readily accommodate a large range of missiles both in physical size and in torque levels.

Although the present invention has been described with reference to the preferred embodiments, workers skilled in the art will recognize that changes may be made in form and detail without departing from the spirit and scope of the foregoing disclosure. Accordingly, the scope of the invention should be limited only by the claims appended hereto.

We claim:

1. An aeroload torque simulator comprising: a servo valve for converting a variable electrical input signal into a variable hydraulic pressure output signal, amplifier means adapted for providing variable output electrical signals to said servo valve in response to selectable amplifier input signals, an actuator coupled to receive said variable hydraulic pressure output signal and adapted for physical coupling to a test article for applying torque loads thereto, a differential pressure transducer coupled to receive the hydraulic pressure output signal of said servo valve for providing a feedback input for said amplifier means, said amplifier means being a summing amplifier adapted for receiving a variable voltage command input and feedback voltage input from said pressure transducer for providing a differential output signal, and a potentiometer coupled to said actuator for providing an electrical indication of the angular position of the actuator physical coupling to said test article for indicating torque loads coupled thereto.

2. A simulator as set forth in claim 1 and further comprising pneumatic accumulator means coupled to said variable hydraulic pressure output signal for high frequency damping to allow high gain and bandwidth.

* * * * *